(12) United States Patent
Baum et al.

(10) Patent No.: US 6,456,632 B1
(45) Date of Patent: Sep. 24, 2002

(54) PROTOCOL SEPARATION IN PACKET COMMUNICATION

(76) Inventors: Robert T. Baum, 424 Girard St., #304, Gaithersburg, MD (US) 20877; Edward M. Eggerl, 7414 Inwood Rd., Catonsville, MD (US) 21228; William R. Burton, 106 Country View Ct., Ashton, MD (US) 20861

( * ) Notice: Subject to any disclaimer, the term of this patent is extended or adjusted under 35 U.S.C. 154(b) by 0 days.

(21) Appl. No.: 09/141,725

(22) Filed: Aug. 27, 1998

(51) Int. Cl.[7] .................................................. H04J 1/00
(52) U.S. Cl. ....................................... 370/490; 370/392
(58) Field of Search ................................. 370/474, 392, 370/271, 494, 495, 490; 709/231

(56) References Cited

U.S. PATENT DOCUMENTS

| | | | |
|---|---|---|---|
| 4,375,097 A | * 2/1983 | Ulug | ........................... 320/474 |
| 4,538,259 A | 8/1985 | Moore | |
| 5,255,291 A | * 10/1993 | Holden et al. | .............. 370/474 |
| 5,606,668 A | 2/1997 | Shwed | |
| 5,608,786 A | 3/1997 | Gordon | |
| 5,724,355 A | 3/1998 | Bruno et al. | |
| 5,726,984 A | 3/1998 | Kubler | |
| 6,005,873 A | * 12/1999 | Amit | ........................... 370/494 |
| 6,009,471 A | * 12/1999 | Harumoto et al. | ........... 709/231 |

* cited by examiner

Primary Examiner—Salvatore Cangialosi

(57) ABSTRACT

There is provided a protocol separator having a processor with an input port and output ports, and data links connected to the input port and to the output ports, with the data link to the input port carrying packetized data including packets of different protocols, the data link to one of the output ports carrying packets of a first protocol removed from the stream by the processor, and with the data link connected to the other output port carrying the remainder of the packets which were delivered to the input port. The protocol separator operates by determining at least part of a byte in the selected protocol packets which characterizes that protocol, monitoring the stream to detect the occurrence of that part of a byte, and diverting packets containing the part of a byte from the stream to one of the outputs. The remainder of the stream is fed to the second output.

46 Claims, 4 Drawing Sheets

PROTOCOL SEPARATION IN PACKET COMMUNICATION

FIELD OF THE INVENTION

This invention relates to methods and systems to effect protocol segregation or separation in packet communications across networks, and more particularly, to a methodology and system for improving quality of service in the operation of hybrid networks, such as combined telephone networks and packet switched internetworks, such as the Internet. In one aspect the invention relates to an improved protocol separation or segregation mechanism and methodology for raising the speed of operation of packet networks handling real time as well as data service.

BACKGROUND OF THE INVENTION

The potential development of telephony over the Internet technology as a viable commercial telephony service has attracted interest by equipment and software vendors as well as long distance and local exchange carriers. Recently the patent literature has begun to reflect an interest in aspects of such a service.

U.S. Pat. No. 5,726,984, issued Mar. 10, 1998, to Kubler, et al. entitled Hierarchical Data Collection Network Supporting Packetized Voice Communications Among Wireless Terminals and Telephones. That patent describes a packet-based communication system in which wired and wireless communication networks exhibiting substantially different characteristics are employed to link portable or mobile computing devices. The network accommodates real time voice transmission through a packet-based routing within a data network. Conversion and call processing circuitry enables access devices and personal computers to adapt voice information between analog voice streams and digital voice packet formats. Routing pathways include wireless spanning tree networks, wide area networks, telephone switching networks, Internet, etc. A voice session and associated call setup simulates that of conventional telephone switching network. Voice packets are queued in the receiving processors to take into consideration packet delivery delays within the Internet and prevent gaps in the delivered voice signals.

Other proposals have been made to deal with such delays. U.S. Pat. No. 4,538.259, issued Aug. 27, 1985, to Brian B. Moore entitled System for Digitized Voice and Data with Means to Compensate for Variable Path Delays. That patent describes a communication system in which voice is transmitted as packets of digitized samples and the receiving station delays the output of the first packet to compensate for wide variations in the intervals at which successive packets are received. According to one feature of this system, a first packet is transmitted at a higher priority so that a greater delay can be used without encountering problems that arise from the uncertainty in the delay in transmitting the packet. In another feature of this system, the arrival time of the first few packets of a conversation are detected and the delay is readjusted in case the first packet has been unusually delayed.

U.S. Pat. No. 5,724,355 issued Mar. 3, 1998 to Bruno et al. entitled Network Access to Internet and Stored Multimedia Access Services from a Terminal Supporting the H.320 Protocol. That patent describes a system for providing video conferencing services over the Internet.

In addition to the approaches to the packet delay problem addressed in the foregoing patents, there is also the problem of security. In providing a gateway between a secure network, such as a switched telephone network, and an unsecure network, such as the Internet, the protection and maintenance of network security immediately becomes a concern. Protecting a secure network from unauthorized use or attack is of paramount importance to any organization. When the secure network constitutes the public switched telephone network (PSTN) the seriousness of the threat is self-evident. In communicating with essentially real time applications such as telephony via packets, there is a need for both consistency and speed. The packets must arrive on a consistent basis and they must arrive quickly. However, generally speaking, when any type of security scheme is implemented, some latency or inconsistency is introduced into the data stream. When a very limited number of streams are involved the problem is manageable. However, as the number of streams starts increasing it is much more difficult to provide adequate security at an acceptable cost without introducing quality of service problems.

It is a primary object of the invention to provide a new mechanism and methodology for coping with and alleviating the latency problem encountered in packet communication when handling substantially real time applications.

It is another object of the invention to provide a new process for transporting a stream of packetized data including packets of different protocols by determining at least part of a byte in the packets which characterizes a selected one of the protocols, monitoring the stream to detect the occurrence of that part of a byte, and diverting packets containing the part of a byte from the stream.

It is yet another object of the invention to provide a novel protocol separator having a processor with an input port and output ports, and data links connected to the input port to the outputs port, with the data link to the input port carrying packetized data including packets of different protocols, the data link to one of the output ports carrying packets of a first protocol removed from the stream by the processor, and with the data link connected to the other output port carrying the remainder of the packets delivered to the input port.

SUMMARY OF THE INVENTION

According to a preferred embodiment of the invention, a protocol separator which includes a processor is provided and has an input port and output ports, with data links connected to the ports. The data link to the input port carries a stream of packetized data input, which includes packets of different protocols. Packets of a selected protocol are removed from the stream by the processor and outputted via one of the output ports and links. The remainder of the input stream is outputted via the second output port and link. The protocol separator operates by determining at least part of a byte in the selected protocol packets which characterizes that protocol, monitoring the incoming stream to detect the occurrence of that part of a byte, and diverting packets containing the part of a byte from the stream to the first output. The remainder of the stream is fed to the second output.

BEST MODE FOR CARRYING OUT THE INVENTION

Certain basics of packet communication are here reviewed as an aid to describing the invention.

At the heart of any computer network is a communication protocol. A protocol is a set of conventions or rules that govern the transfer of data between computer devices. The simplest protocols define only a hardware configuration, while more complex protocols define timing, data formats, error detection and correction techniques and software structures.

Computer networks almost universally employ multiple layers of protocols. A low-level physical layer protocol assures the transmission and reception of a data stream between two devices. Data packets are constructed in a data link layer. Over the physical layer, a network and transport layer protocol governs transmission of data through the network, thereby ensuring end-to-end reliable data delivery.

The most common physical networking protocol or topology for small networks is Ethernet, developed by Xerox. When a node possesses a packet to be transmitted through the network, the node monitors the backbone and transmits when the backbone becomes clear. There is no central backbone master device to grant requests to gain access to the backbone. While this type of multipoint topology facilitates rapid transmission of data when the backbone is lightly utilized, packet collisions may occur when the backbone is heavily utilized. In such circumstances, there is a greater chance that multiple nodes will detect that the backbone is clear and transmit their packets coincidentally. If packets are impaired in a collision, the packets are retransmitted until transmission is successful.

Figure 1:
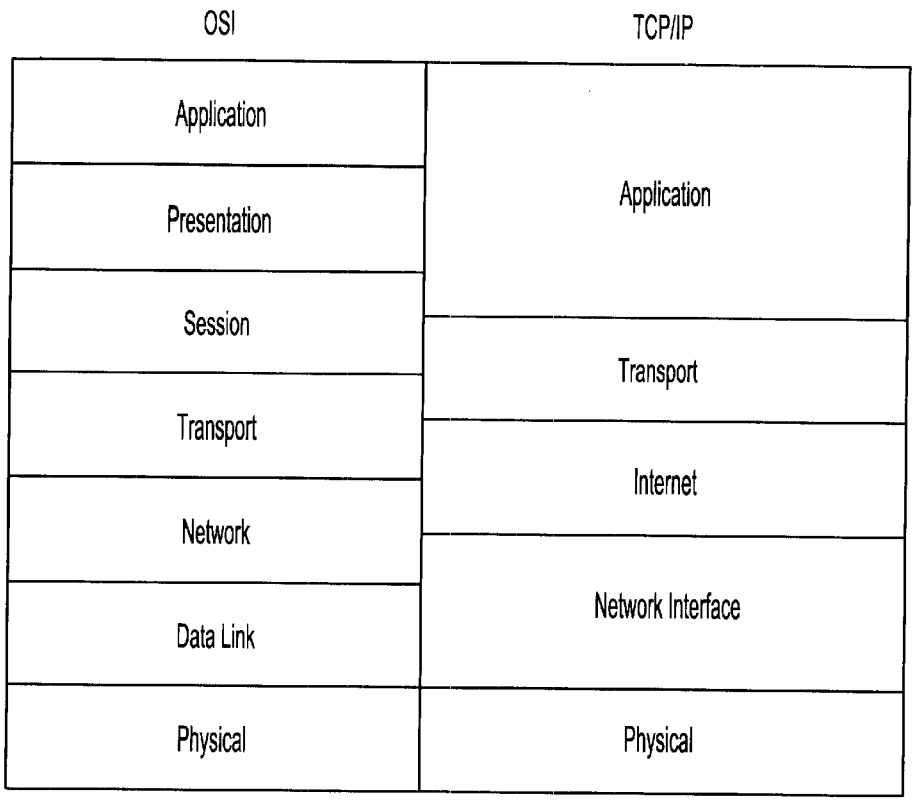
FIG. 1 is a diagram of the OSI Open Systems Interconnection reference model and the five layer TCP/IP model.
Figure 2:
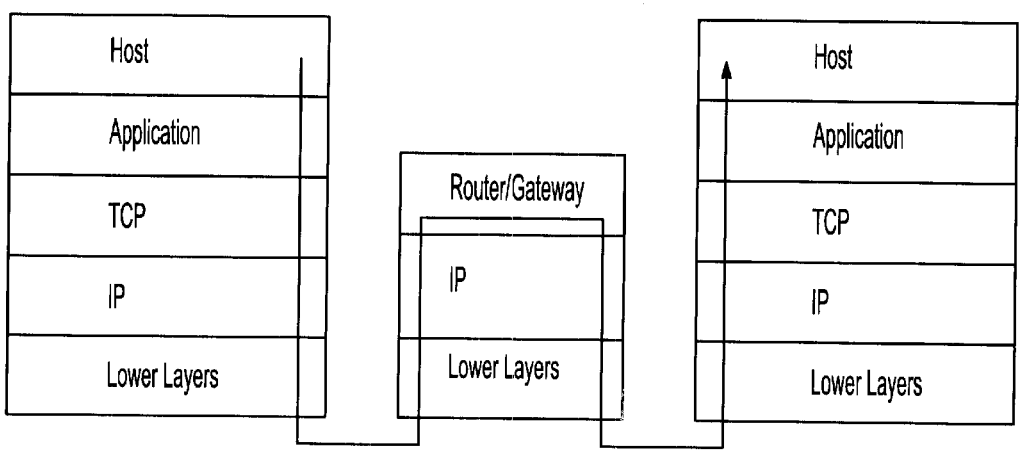
FIG. 2 is a diagrammatic showing of the passage of a packet from the application layer of one host to the application layer of another host.
Figure 4:
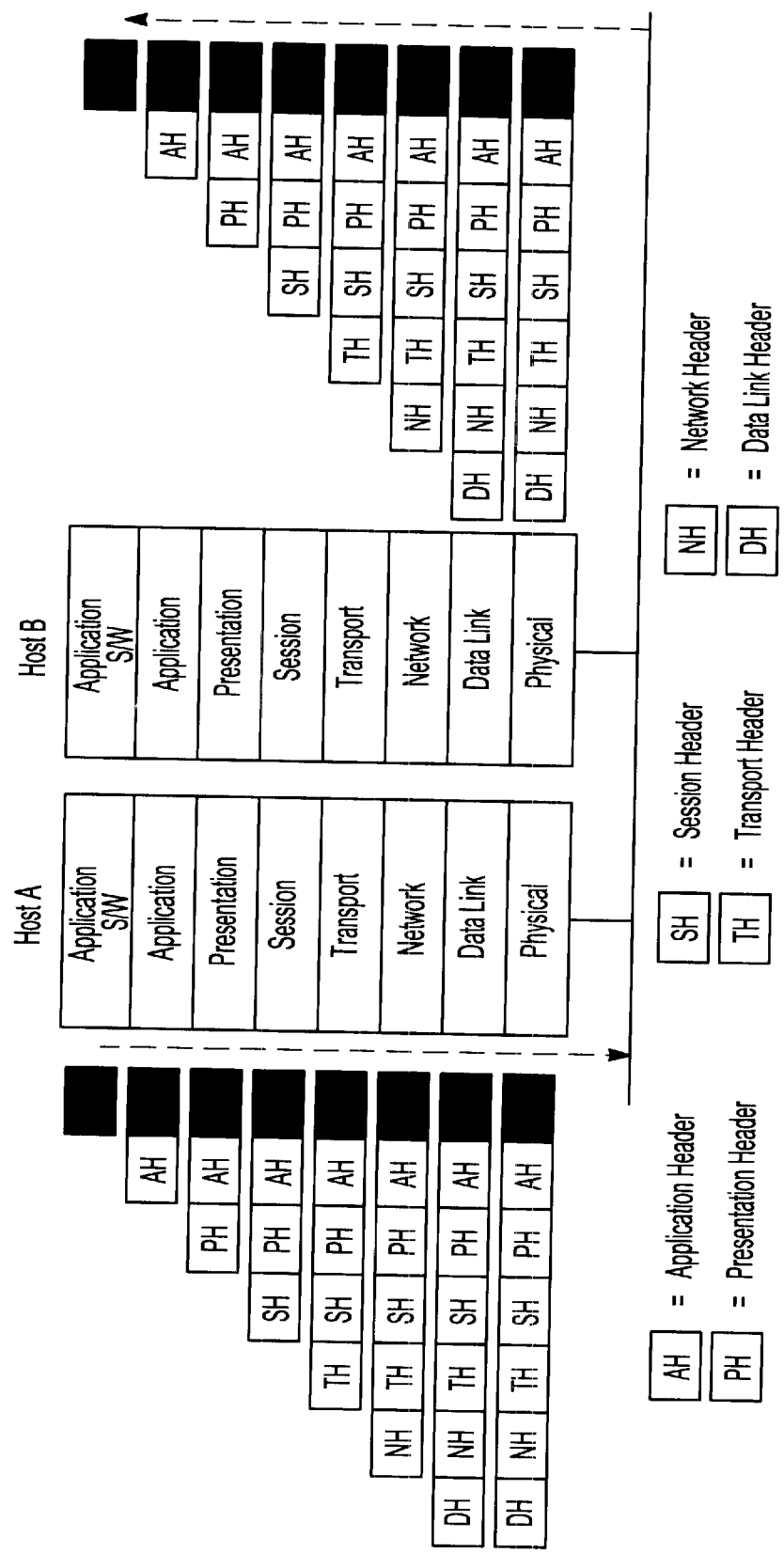
FIG. 4 shows diagrammatically the frame construction and reduction in transferring packets between hosts.

As computer networks have developed, various approaches have been used in the choice of communication medium, network topology, message format, protocols for channel access, and so forth. Some of these approaches have emerged as de facto standards, but there is still no single standard for network communication. However, a model for network architectures has been proposed and widely accepted. It is known as the International Standards Organization (ISO) Open Systems Interconnection (OSI) reference model. A diagram of the OSI model is shown on the left in FIG. 1. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction. The downward and upward transfer is illustrated in FIGS. 2 and 4.

The lowest layer defined by the OSI model is called the physical layer, and is concerned with transmitting raw data bits over the communication channel. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that appears error-free to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) sublayer. This sublayer determines which station should get access to the communication channel when there are conflicting requests for access. The functions of the MAC layer are more likely to be dependent on the nature of the transmission medium.

Bridges may be designed to operate in the MAC sublayer. The basic function of a bridge is to listen "promiscuously," i.e. to all message traffic on all LANs to which it is connected, and to forward each message it hears onto LANs other than the one from which the message was heard. Bridges also maintain a database of station locations, derived from the content of the messages being forwarded. Bridges are connected to LANs by paths known as "links." After a bridge has been in operation for some time, it can associate practically every station with a particular link connecting the bridge to a LAN, and can then forward messages in a more efficient manner, transmitting only over the appropriate link. The bridge can also recognize a message that does not need to be forwarded, because the source and destination stations are both reached through the same link. Except for its function of "learning" station locations, or at least station directions, the bridge operates basically as a message repeater.

As network topologies become more complex, with large numbers of LANs, and multiple bridges interconnecting them, operational difficulties can ensue if all possible LAN bridging connections are permitted. In particular, if several LANs are connected by bridges to form a closed loop, a message may be circulated back to the LAN from which it was originally transmitted, and multiple copies of the same message will be generated. In the worst case, messages will be duplicated to such a degree that the networks will be effectively clogged with these messages and unable to operate at all.

To prevent the formation of closed loops in bridged networks, IEEE draft publication P802.1D, referred to above, proposes a standard for a spanning tree algorithm that will connect the bridged network into a tree configuration, containing no closed loops, and spanning the entire network configuration. The spanning tree algorithm is executed periodically by the bridges on the interconnected network, to ensure that the tree structure is maintained, even if the physical configuration of the network changes. Basically, the bridges execute the spanning tree algorithm by sending special messages to each other to establish the identity of a "root" bridge. The root bridge is selected, for convenience, as the one with the smallest numerical identification. The algorithm determines which links of the bridges are to be active and which are to be inactive, i.e. disabled, in configuring the tree structure. One more piece of terminology is needed to understand how the algorithm operates. Each LAN has a "designated" link, which means that one of the links connectable to the LAN is designated to carry traffic toward and away from the root bridge. The basis for this decision is similar to the basis for selecting the root bridge. The designated link is the one providing the least costly (shortest) path to the root bridge, with numerical bridge identification being used as a tiebreaker. Once the designated links are identified, the algorithm chooses two types of links to be activated or closed: first, for each LAN its designated link is chosen, and second, for each bridge a link that forms the "best path" to the root bridge is chosen, i.e. a link through which the bridge received a message giving the identity of the root bridge. All other links are inactivated. Execution of the algorithm results in interconnection of the LANs and bridges in a tree structure, i.e. one having no closed loops.

The Internet is a collection of networks, including Arpanet, NSFnet, regional networks such as NYsernet, local networks at a number of university and research institutions, and a number of military networks. The protocols generally referred to as TCP/IP were originally developed for use only through Arpanet and have subsequently become widely used in the industry. The protocols provide a set of services that permit users to communicate with each other across the entire Internet.

The basic function of the Transmission Control Protocol (TCP) is to make sure that commands and messages from an application protocol, such as computer mail, are sent to their desired destinations. TCP keeps track of what is sent, and retransmits anything that does not get to its destination correctly. If any message is too long to be sent as one "datagram," TCP will split it into multiple datagrams and makes sure that they all arrive correctly and are reassembled for the application program at the receiving end. Since these functions are needed for many applications, they are collected into a separate protocol (TCP) rather than being part of each application. TCP is implemented in the transport layer of the OSI reference model.

The Internet Protocol (IP) is implemented in the network layer of the OSI reference model, and provides a basic service to TCP: delivering datagrams to their destinations. TCP simply hands IP a datagram with an intended destination; IP is unaware of any relationship between successive datagrams, and merely handles routing of each datagram to its destination. If the destination is a station connected to a different LAN, the IP makes use of routers to forward the message.

TCP/IP frequently uses a slight deviation from the seven-layer OSI model in that it may have five layers. These five layers are combinations and derivatives of the seven-layer model and are shown in shown in FIG. 1. The five layers are as follows:

Layer 5—The Application Layer. Applications such as ftp, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue, as is shown in FIG. 2. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level makes use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e. no two hosts, wherever located, have the same data link layer address. There is a protocol called ARP (address resolution protocol), which obtains a data link layer address from the corresponding network layer address (the address that IP uses). Typically, each router maintains a database table from which it can look up the data link layer address, but if a destination host is not in this ARP database, the router can transmit an ARP request. This message basically means: "will the host with the following network layer address please supply its data link layer address." Only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram 's IP header with an entry in the current node 's (typically but not always a router) routing table.

Each node 's involvement in the routing process consists only of forwarding packets based on internal information resident in the router, regardless of whether the packets get to their final destination. To extend this explanation a step further, IP routing does not alter the original datagram. In particular, the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header.

The next hop address defined by the method above is not stored in the IP datagram. There is no reserved space to hold it and it is not "stored" at all. After executing the routing algorithm (the algorithm is specific to the vendor/platform) to define the next hop address to the final destination. The IP protocol software passes the datagram and the next hop address to the network interface software responsible for the physical network over which the datagram must now be sent.

The network interface software binds the next hop address to a physical address (this physical address is discovered via address resolution protocols (ARP, RARP, etc. ), forms a frame (Ethernet, SMDS, FDDI, etc. —OSI layer 2 physical address) using the physical address, places the datagram in the data portion of the frame, and sends the result out over the physical network interface through which the next hop gateway is reached. The next gateway receives the datagram and the foregoing process is repeated.

In addition, the IP does not provide for error reporting back to the source when routing anomalies occur. This task is left to another Internet protocol, the Internet Control Message Protocol (ICMP).

A router will perform protocol translation. One example is at layers 1 and 2. If the datagram arrives via an Ethernet interface and is destined to exit on a serial line, for example, the router will strip off the Ethernet header and trailer, and substitute the appropriate header and trailer for the specific network media, such as SMDS, by way of example.

A route policy may be used instead of routing table entries to derive the next hop address. In the system and methodology of the present invention, the source address is tested to see in which ISP address range it falls. Once the ISP address range is determined the packet is then routed to the next hop address associated with the specific ISP.

Data communications network services have two categories of call establishment procedures: econnection-oriented and connectionless.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction—enough for its performance not to depend on clean, high-quality optical fiber lines. Frame relay, regarded as the first generation of fast packet technology, is well suited for high-speed bursty data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

SMDS supports LAN interconnection and allows the transfer of large, variable length service data units (SDUs). Like frame relay, SMDS allows the user to connect multiple remote routers without having to employ a mesh network. However, as compared to frame relay, SMDS affords a number of advantages. Among these are that it is a connectionless service better suited for LAN traffic, it supports higher access rates and throughput for evolving applications (DS3 and SONET), it supports higher burstiness, and SMDI's cell relay technology implies that it will migrate smoothly to BISDN.

The process of routing packets over the Internet is also considered a connectionless network service. The Internet Protocol (IP) addresses packets from sender to receiver. It is still used mostly in conjunction with the Transmission Control Protocol (TCP), which establishes a connection between end users to manage the traffic flow and ensures the data are correct, providing end-to-end reliability. The combination, known as TCP/IP, is the Internet's main backbone protocol suite.

Asynchronous transfer mode (ATM) is a connection-oriented network service. It is a high-bandwidth, fast-packet switching and multiplexing technique that segments packets into 53-byte cells. It supports sound (voice and audio), data, documents (text, graphics and still images), and video (moving pictures with sound) ATM and SDH/SONET are key technologies enabling broadband ISDN.

Figure 3:
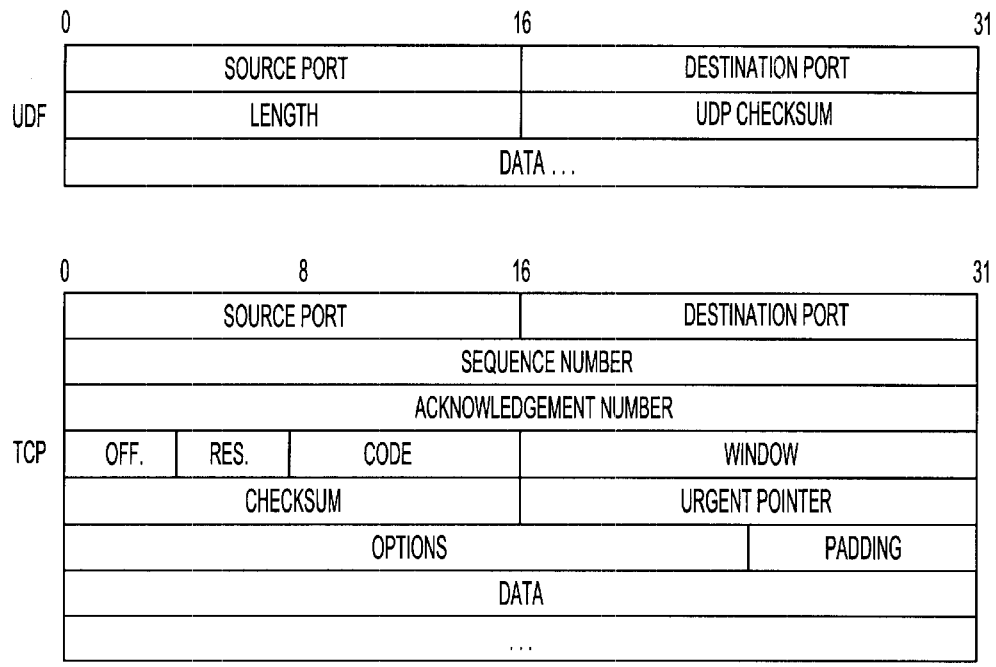
FIG. 3 shows the respective formats of UDP packets, on the one hand, and TCP packets, on the other.

While using a layered protocol stack offers a number of advantages it also has the effect of increasing the overhead on the frame that actually travels over the network. This is because each protocol layer must add its own marker or header or trailer or both. The process of building a network frame from the Application Message is called frame construction. The reverse process is called frame reduction. The cycle is shown in FIG. 3. As frames move down the model, the software operating at each layer appends its own marker information around the data unit. For any given layer, the information it receives from above is regarded as data, even though it may contain overhead already.

FIG. 3 shows the respective formats of UDP packets, on the one hand, and TCP packets, on the other. A datagram protocol is one that imposes a maximum size on the amount of data that can be sent in a single transmission. Ethernet, IP, and UDP are all datagram-based protocols. TCP is a stream-oriented protocol. TCP breaks the transmission into smaller sizes, retransmitting lost pieces, reordering data delivered out of order, and filtering out any extras that might occur due to faulty retransmissions. TCP is a reliable protocol, while UDP in itself is not. The overhead necessary to support TCP is proportionally higher than that of UDP.

Real time applications, such as packet telephony, use UDP because there is no sequencing of the data. If a packet is received out of sequence it is dropped. There is no request for a repeat. UDP may be said to be network friendly since it does not burden the network with the repeat requests that result from collisions. The acting router tends to become heavily loaded and this only increases the number of collisions and the resultant re-requests. When the number of repeat requests grows too large, an inundated system results. With UDP, on the other hand, a large number of collisions results in a fewer number of packets.

According to the invention this phenomenon is used in a novel fashion to provide a significant reduction in traffic in the area of the network which is carrying the UDP packets. This is realized by discriminating between the UDP packets and packets using other protocols. The UDP packets are separated from the main stream and redirected to achieve a reduction in traffic and collisions, with a concomitant increase in speed and reduction of latency. The separated traffic is channeled to another network or layer of the network to move at a higher speed. Both networks benefit.

However, the inventors have found that the concept of separation of the real time and data packets alone is of limited value if the separation is produced by a router performing redirection based on addresses in the packets. The necessary process of opening the packets to access the needed address in the headers is so time consuming that the quality of service actually is degraded rather than improved. The dual network flow concept is of little value in the absence of an effective method to implement the separation.

It is a major feature of the invention that it has discovered a way in which this may be accomplished without the problems which have been found to be associated with address switching. According to the invention it has been found that it is possible to identify the UDP packets without the necessity of opening the packets to access the address headers. It is possible to effect this through the use of a simple comparator to look at the bit stream and identify and redirect the UDP packets.

Figure 5:
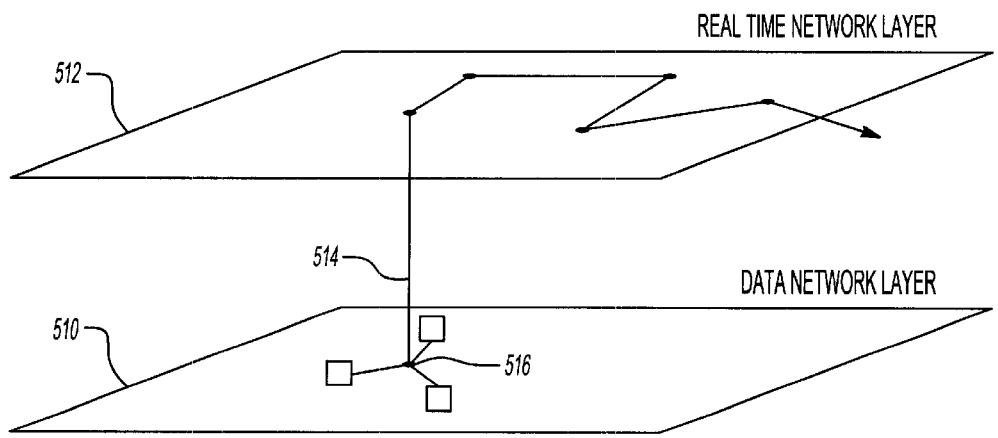
FIG. 5 is a diagrammatic depiction or layered view of an internetwork according to one preferred embodiment of the invention.

FIG. 5 is a diagrammatic depiction or layered view of an internetwork according to one preferred embodiment of the invention. The network is depicted as operating in two layers, with a lower layer to handle data traffic (TCP), and an upper layer to handle real time traffic (UDP). These two layers of operation are shown in the drawing at 510 and 512. The x and y axes depict geographic location. The z-axis depicts the separation of the two layers. The lower level 510 may be the presently existing data network. It may be capable of handling real time UDP traffic as well as data traffic in some geographic areas, while being incapable of satisfactorily handling the combined traffic in other areas.

According to the invention a crossover between the layers is provided as shown at 514. The node 516 in the data layer 510 effects identification of UDP protocol packets and redirects those packets to the real time layer 512, without reading the packet addresses. Details of one preferred device for accomplishing this redirection are shown in FIG. 6.

Figure 6:
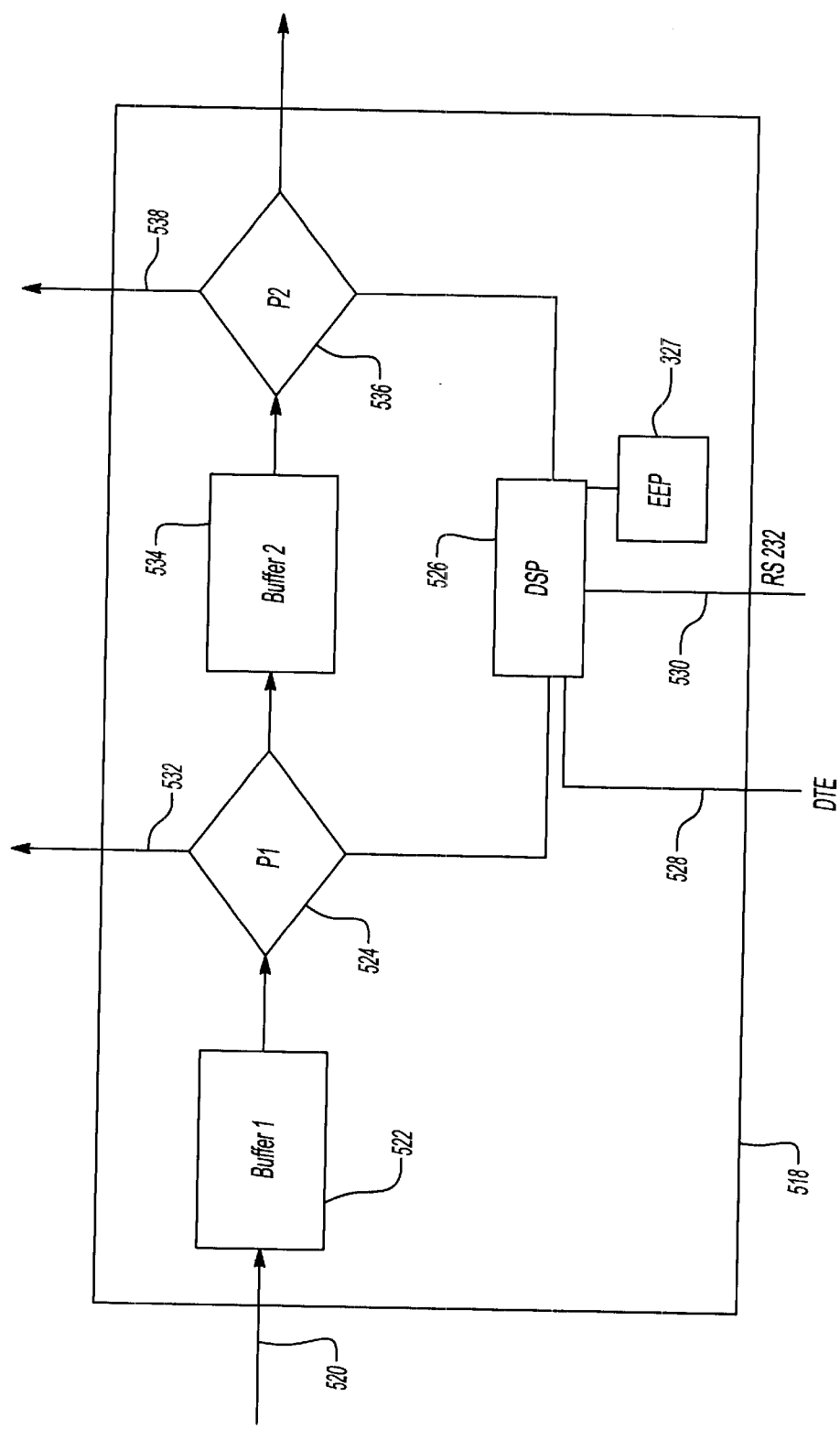
FIG. 6 shows one embodiment of a protocol separator according to one preferred embodiment of the invention.

Referring to FIG. 6, there is shown what may be regarded as a protocol separator 518. The separator 518 may include an Ethernet input port 520. This input port is connected to a data link which transports to the port a mixed input of UDP and TCP, and possibly other protocol packets. The input stream is fed to a buffer 522 and from there to a switching device 524. This switching device does not comprise a conventional packet switch, in that it does not read the packet address and then perform switching on the basis of the address.

Coupled to the switching device 524 is a digital signal processor 526 having an electronically erasable programmable read only memory (EEPROM). The EEPROM stores the desired patterns to control the switching. A DTE (Data Terminating Equipment) 528 is provided to permit control from a console. The EEPROM is also subject to control via an RS 232 link 530 which permits remote internetwork control. The switching device 524 is also provided with a first output port 532 which is connected to the crossover 514. The switching device has a second output port connected to an output link 533.

In operation, the protocol separator 518 acts as a comparator to look at the incoming bit stream. A packet in UDP protocol is identifiable by noting the occurrence of a single byte at a designated position in the stream. With UDP protocol the $10^{th}$ byte of an IP packet should be 00010001 (11in hexideximal). The comparator counts back from the commencement of an IP packet to the $10^{th}$ position. It then looks at one or more bits in that byte for a match to the programmed pattern. If a match is found, the stream is redirected. The particular number of bits to be noted is based on the number of the first bit which may be relied upon to distinguish the UDP packets from packets using other protocols which are being handled.

For example, by way of illustration and not limitation, if the first bit in the designated byte is different for UDP than with any of the other protocols being handled, it is then possible to act on the identification of a single bit. This provides very rapid redirection of the stream with no significant increase in latency, i.e., there is no delay introduced. This feature makes it possible to use the two-layer network method to significantly improve the quality of service which can be provided for real time signals.

Referring again to FIG. 5, it will be seen that it is another feature of the invention that decisions in addition to that implemented by the switching device 524 may be provided. Thus the protocol separator 518 may include a second buffer 534 and switching device 536 connected to the DSP 526. This second switching device 536 may implement redirection to the port 538 based on any bit criteria which is programmed. However, while additional decisions may be added, the benefit from the standpoint of speed decreases with each additional decision added. The introduction of the switching device 524 and its functioning will introduce a finite, if small, delay. Thus, the addition of a larger number of decisions will introduce additional delays. The desirability of using such additional switching or redirection will depend on the specific nature and purpose of each additional decision.

It will be seen from the foregoing that the invention provides a unique method and system for improving the quality of service in handling real time packet traffic, as well as a new method of protocol discrimination and redirection. The system permits use of multiple layer networks to provide segregated handling of packets of different protocols.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method comprising:
   transporting a stream of packetized data including packets of different protocols;
   determining at least part of a byte in said packets which characterizes one of said protocols;
   monitoring said stream to detect the occurrence of said at least part of a byte; and
   diverting packets containing said at least part of a byte from said stream.

2. A method according to claim 1 wherein said characteristic comprises one or more bits in said byte.

3. A method according to claim 2 wherein said byte appears in a fixed position in packets in which it is found.

4. A method according to claim 3 wherein said monitoring is performed in a manner other than reading an address.

5. A method according to claim 4 wherein said monitoring step includes counting byte positions in a packet.

6. A method according to claim 1 wherein said monitoring is performed in a manner other than reading an address.

7. A method according to claim 1 wherein said part of a byte consists of one bit.

8. A method according to claim 7 wherein said protocol comprises User Datagram Protocol (UDP).

9. A method according to claim 1 wherein said stream comprises a TCP/IP stream including User Datagram Protocol (UDP) packets.

10. A protocol separator comprising:
a processor device having an input port and multiple output ports;
a first data link connected to said input port carrying packetized data including packets of different protocols;
a second data link connected to one of said output ports carrying packets of a first protocol removed from said stream by said processor device; and
a third data link connected to the other of said two output ports carrying the remainder of the packets delivered to said input port;
said packets of a first protocol being separated from the packets entering said input port by said processor device monitoring said stream to detect the occurrence of at least part of a predetermined byte in the monitored packets which characterizes said first protocol, and directing identified packets to said second data link, and directing the remainder of the packets to said third data link.

11. A device according to claim 10 wherein said part of said byte comprises one or more bits.

12. A device according to claim 11 wherein said wherein said byte appears in a fixed position in packets in which it is found.

13. A device according to claim 12 wherein said monitoring is performed in a manner other than reading an address.

14. A device according to claim 13 wherein said monitoring step includes counting byte positions in a packet.

15. A device according to claim 14 wherein said part of a byte consists of one bit.

16. A device according to claim 15 wherein said protocol comprises User Datagram Protocol (UDP).

17. A device according to claim 14 wherein said packetized data on said first link comprises a TCP/IP data including User Datagram Protocol (UDP) packets.

18. A method of transporting User Datagram Protocol (UDP)packets containing packetized voice over a packet internetwork system having dual pathways, comprising:
inputting a stream of multi-protocol packets to one of said pathways;
determining at least part of a byte in said packets which characterizes the packets containing packetized voice;
monitoring said stream to detect the occurrence of said at least part of a byte; and
diverting packets containing said at least part of a byte from said stream to the other of said pathways.

19. A method according to claim 18 wherein said characteristic comprises one or more bits in said byte.

20. A method according to claim 19 wherein said byte appears in a fixed position in packets in which it is found.

21. A method according to claim 20 wherein said monitoring is performed in a manner other than reading an address.

22. A method according to claim 21 wherein said monitoring step includes counting byte positions in a packet.

23. A method according to claim 18 wherein said monitoring is performed in a manner other than reading an address.

24. A met hod according to claim 18 wherein said part of a byte consists of one bit.

25. A method according to claim 24 wherein said protocol comprises User Datagram Protocol (UDP).

26. A method according to claim 18 wherein said stream comprises a TCP/IP stream including User Datagram Protocol (UDP) packets.

27. In a hybrid multi-network communication system including a telephone network coupled to a packet internetwork, the improvement comprising a packet redirector having:
a processor device associated with said packet internetwork and having an input port and multiple output ports;
a first data link connected to said input port carrying packetized data input including packets of different protocols and including packets carrying packetized voice signals from said telephone network;
a second data link connected to one of said output ports carrying packets carrying said packetized voice signals from said telephone network which have been removed from said packetized data input by said processor device;
a third data link connected to the other of said multiple output ports carrying the remainder of the input packets which were delivered to said input port;
said packets carried by said second link having been separated from the packets entering said input port by said processor device monitoring said input to detect the occurrence of at least part of a predetermined byte in the monitored packets which characterizes said packets carrying packetized voice, and directing identified packets to said second data link, and directing the remainder of the packets to said third data link.

28. A system according to claim 27 wherein said internetwork has two pathways and said second link is connected to one of said pathways and said third link is connected to the other of said pathways.

29. A system according to claim 28 wherein said internetwork comprises the Internet.

30. A system according to claim 28 wherein said characteristic comprises one or more bits in said byte.

31. A system according to claim 28 wherein said byte appears in a fixed position in packets in which it is found.

32. A system according to claim 31 wherein said monitoring is performed in a manner other than reading an address.

33. A system according to claim 31 wherein said monitoring step includes counting byte positions in a packet.

34. A system according to claim 33 wherein said monitoring is performed in a manner other than reading an address.

35. A system according to claim 34 wherein said part of a byte consists of one bit.

36. A method of transporting packets of different protocols via different segments of a communication network, comprising:
receiving a stream of packetized data including data packets in a plurality of different protocols;
monitoring the stream to determine the presence or absence of at least part of a predetermined byte, which characterizes one of said protocols, in each of the received packets;
transporting packets determined to contain said at least part of the predetermined byte via a first segment of the communication network; and
transporting packets determined to not contain said at least part of the predetermined byte via a second segment of the communication network separate from the first segment of the communication network.

37. A method as in claim 36, wherein the transporting of the packets determined to contain said at least part of the predetermined byte via the first segment of the communication network provides a quality of service supporting real-time communications traffic.

38. A method as in claim 37, wherein the transporting of the packets determined to contain said at least part of the predetermined byte via the first segment of the communication network provides increased speed and reduced latency.

39. A method as in claim 36, wherein the one protocol comprises User Datagram Protocol (UDP).

40. A method as in claim 39, wherein another one of the protocols comprises Transmission Control Protocol (TCP).

41. A method as in claim 40, wherein at least some packets of UDP carry voice telephone communications data.

42. A method as in claim 36, wherein said predetermined byte appears in a fixed position in each packet in which it is present.

43. A method as in claim 36, wherein said monitoring is performed in a manner other than reading an address.

44. A packet communication network comprising: first and second network layers for transporting packetized data; a network node, comprising:
(a) an input data link interface, for receiving a stream of packetized data including data packets in a plurality of different protocols;
(b) a first output data link interface coupled for transmission of data packets via the first network layer;
(c) a second output data link interface coupled for transmission of data packets via the second network layer; and
(d) a processor for: monitoring the stream of packetized data received via the input data link interface, to determine the presence or absence of at least part of a predetermined byte, which characterizes one of said protocols, in each of the received packets; directing packets determined to contain said at least part of the predetermined byte for transmission through the first output data link interface to the first network layer; and directing other packets for transmission through the second output data link interface to the second network layer.

45. A network as in claim 44, wherein the first network layer provides a quality of service supporting real-time communications traffic.

46. A network as in claim 44, wherein the processor is adapted such that the monitoring is performed in a manner other than reading an address.

* * * * *